(12) United States Patent
Clark et al.

(10) Patent No.: US 7,376,609 B2
(45) Date of Patent: May 20, 2008

(54) MAXIMIZATION OF A HEDGED INVESTMENT BUDGET FOR AN INDEX-LINKED INSURANCE PRODUCT

(75) Inventors: Brian James Clark, Clive, IA (US); William Jeffrey Heng, West Des Moines, IA (US)

(73) Assignee: Aviva USA Corporation, Des Moines, IA (US)

( * ) Notice: Subject to any disclaimer, the term of this patent is extended or adjusted under 35 U.S.C. 154(b) by 1505 days.

(21) Appl. No.: 09/845,669

(22) Filed: Apr. 30, 2001

(65) Prior Publication Data
US 2006/0041453 A1    Feb. 23, 2006

(51) Int. Cl.
G06Q 40/00    (2006.01)
(52) U.S. Cl. .................. 705/36 R; 705/35; 705/36 T
(58) Field of Classification Search .............. 705/35, 705/36, 38, 4
See application file for complete search history.

(56) References Cited

U.S. PATENT DOCUMENTS

| | | | |
|---|---|---|---|
| 5,704,045 A | 12/1997 | King et al. | |
| 6,049,772 A * | 4/2000 | Payne et al. | 705/4 |
| 6,321,212 B1 | 11/2001 | Lange | |
| 6,343,272 B1 * | 1/2002 | Payne et al. | 705/4 |
| 6,360,210 B1 | 3/2002 | Wallman | |
| 6,636,834 B1 * | 10/2003 | Schirripa | 705/36 R |
| 2002/0040307 A1 * | 4/2002 | Roscoe et al. | 705/4 |
| 2002/0138388 A1 | 9/2002 | Reiss | |
| 2002/0147670 A1 | 10/2002 | Lange | |
| 2004/0030625 A1 | 2/2004 | Rabson et al. | |
| 2005/0154617 A1 | 7/2005 | Ruggieri et al. | |

OTHER PUBLICATIONS

A. Mody, D. Patro, Methods of Loan Guarantee Valuation and Accounting, 1995, sitesources.worldbank.org, pp. 4-5 and 8-9.*
Amerus Life Insurance Company, Equity Advantage Annuity, The Road to Financial Freedom, Jul. 1997.
Amerus Life Insurance Company, Equity Advantage Annuity Interest Crediting, Jul 1997.
Amerus Life Insurance Company, Equity Index Annuities, Agent Reference Guide, Nov. 1999.

(Continued)

Primary Examiner—James A. Kramer
Assistant Examiner—Jocelyn W. Greimel
(74) Attorney, Agent, or Firm—Sutherland Asbill & Brennan LLP

(57) ABSTRACT

An index-linked insurance product having an annual guarantee is implemented having a maximized hedged investment budget. A net premium payment is allocated to a fixed income investment and an annual fixed income yield is projected. The maximized hedged investment budget is determined by deducting from the projected annual fixed income a product spread and an estimated cost of the annual guarantee. The deducted estimated cost of the annual guarantee is allocated to a risk fund. The maximized hedged investment budget is allocated to a hedged investment designed to generate proceeds for supporting index-linked earnings credited to the index-linked insurance product. Upon expiration of the product term, if the amount credited based on the index-linked earnings does not equal to at least the compounded annual guarantee, the amount credited is increased to be equal to the compounded annual guarantee. The increased credit may be supported using funds from the risk fund and other reserves if necessary.

55 Claims, 6 Drawing Sheets

OTHER PUBLICATIONS

Amerus Life Insurance Company, Multi Choice Annuity, Agent Reference Guide, May 2000.

Amerus Life Insurance Company, FoundationBuilder Plus, Agent Reference Guide, Oct. 1998.

Amerus Life Insurance Company, FoundationBuilder Plus, Brochure.

Amerus Life Insurance Company, Flexible Premium Life Insurance, May 1, 1998.

Amerus Life Insurance Company, GenerationBridge, Agent Reference Guide, Oct. 1998.

Amerus Life Insurance Company, GenerationBridge, Brochure.

Amerus Life Insurance Company, Equity Index Account Value Endorsement, May 1, 1998.

Amerus Life Insurance Company, Independent Choices, Agent Guide, Aug. 2000.

Amerus Life Insurance Company, Independent Choices, Brochure, Oct. 2000.

Amerus Life Insurance Company, Fixed Premium Life Insurance, Jun. 23, 2000.

* cited by examiner

MAXIMIZATION OF A HEDGED INVESTMENT BUDGET FOR AN INDEX-LINKED INSURANCE PRODUCT

TECHNICAL FIELD

The present invention relates generally to index-linked life insurance products where the interest rate for the life insurance product is based on the performance of an equity market index and where the life insurance product offers a minimum guaranteed annual interest rate. More particularly, the present invention relates to maximizing a hedged investment budget associated with an index-linked life insurance product, while also setting aside sufficient monies to satisfy the minimum guaranteed annual interest rate.

BACKGROUND OF THE INVENTION

Traditional life insurance products are known in the art as "fixed" life insurance products. Fixed life insurance products offer a minimum guaranteed annual interest rate (referred to herein as an "annual guarantee") on policy funds net of insurance and administrative charges. The insurance company generally invests a portion of the premium in fixed income securities such as bonds and mortgages. The yield on such fixed income investments determines a gross return from which product charges may be deducted to then calculate the policy credited rate and/or dividends. Regardless of the performance of the insurance company's investment in the fixed income securities, the credited rate and/or cash values of the fixed life insurance product cannot be less than a guaranteed minimum.

"Variable" life insurance products are also popular with consumers and are also well known in the art. Variable life insurance products generally allow the consumer to determine how the premium (net of insurance, administrative, and product spread charges) will be invested by directing the funds to various sub-account choices that are available within the product. These sub-account choices carry distinct risks, as there is neither an annual guarantee on the investment performance nor a guarantee of the principal allocated to the sub-accounts. Sub-accounts usually carry risks similar to those of equity or bond mutual funds, including the upside potential and downside risk to loss of principal.

"Index-linked" life insurance products are more recent introductions into the market. Such products typically provide an annual guarantee like that provided by traditional fixed insurance products. In an index-linked life insurance product, all or a portion of the product's account value may be eligible for index-linked earnings based on increases in a specified equity market index. An index-linked life insurance product is typically credited with the greater of the index-linked earnings rate or the annual guarantee (determined on a compounded basis over an established time period) on the applicable portion of the product's account value.

In administering the index-linked account within an index-linked life insurance product, an insurance company typically invests a portion of the premium in fixed income securities such as bonds and mortgages. The investment yield on such fixed income securities is referred to herein as the "investment budget." A product spread, to cover expenses and profit, is usually deducted from the investment budget to determine the "crediting budget." The principal on the fixed income securities supports the index-linked life insurance product's guaranteed principal.

Unlike traditional fixed life insurance products, where the crediting budget is credited to the product, the crediting budget in index-linked life insurance products is used to support the index-linked earnings rate. To do this, the insurance company may invest a portion of the crediting budget in a hedged investment designed to generate proceeds that support the index-linked earnings to be credited to the product. A hedged investment may take a variety of forms, but typically involves the purchase and/or sale of options in the equity market index. A hedged investment is typically structured to be out-of-the-money by an amount equal to the annual guarantee.

In order to ensure that it will be able to cover the amount of the annual guarantee, the typical insurance company does not invest the entire crediting budget in a hedged investment. Rather, the insurance company will set aside a portion (referred to herein as the "guaranteed return budget") of the crediting budget to back the annual guarantee over the specified time period. For example, if the crediting budget is 6.5% and the annual guarantee associated with the index-linked life insurance product is 3%, the insurance company would typically deduct and set aside 3% per year as the guaranteed return budget. The balance of the crediting budget after deduction of the guaranteed return budget (i.e. a balance of 3.5%) is available as the hedged investment budget for purchase of index-linked hedged investments.

Thus, in prior index-linked life insurance products, the guaranteed return budget is credited back to the product each year in order to cover the annual guarantee and any yearly proceeds realized from the hedged investment are used to support any index-linked earnings that exceed the annual guarantee. The amount of index-linked earnings that can be supported through a hedged investment is obviously limited by the amount of the crediting budget that can be allocated to purchase the hedged investment. In other words, the larger the hedged investment budget, the greater the potential for index-linked earnings generated by the hedged investment, and the more attractive the index-linked crediting terms the insurance company can offer to its consumer. However, insurance companies have heretofore been unable to increase the hedged investment budget of an index-linked life insurance product without incurring significant risk that insufficient funds are set aside to cover the annual guarantee.

Accordingly, there remains a need for an index-linked life insurance product having a maximized hedged investment budget for purposes of generating maximum index-linked earnings, while maintaining a sufficient guaranteed return budget to cover the annual guarantee.

SUMMARY OF THE INVENTION

The present invention meets the above-described needs by providing inventive systems and methods for implementing an index-linked life insurance product having a maximized hedged investment budget. According to one aspect of the invention, a portion of a premium payment is allocated to a fixed income investment. An amount of annual fixed income to be yielded by the fixed income investment is projected in order to determine an investment budget. A crediting budget is then determined by subtracting from the investment budget a product spread. Based on a historical analysis or another analysis method, the cost of the annual guarantee is estimated to determine the guaranteed return budget. A hedged investment budget is determined by deducting from the crediting budget the estimated cost of the annual guarantee. The hedged investment budget is allocated to a hedged investment in order to generate proceeds to support the index-linked earnings of the index-linked life insurance product. The estimated cost of the annual guarantee may be set aside in a risk fund, through a pooling of multiple products' guaranteed return budgets. The hedged investment may be structured to be an at-the-money hedge and any proceeds generated thereby may be used to support the index-linked earnings to be credited under the terms of the index-linked life insurance product. The risk fund may be used to supplement the proceeds generated by the hedged investment in the event that the index-linked earnings are not at least equal to the annual guarantee.

In accordance with another aspect of the invention, the annual guarantee is not actually credited to the index-linked product annually, but is guaranteed on a compounded basis over a specified term of the index-linked life insurance product. The index-linked insurance product is credited annually with an amount based on index-linked earnings. The estimated cost of the annual guarantee comprises an estimate of funds that are likely to be required in order to increase the amount credited based on index-linked earnings to be equal to the annual guarantee compounded over the term of the index-linked life insurance product. The term of the index-linked life insurance product is greater than one year and in one embodiment may be set at five years. A longer term of the index-linked life insurance product increases the odds that the index-linked earnings (supported by proceeds from a hedged investment) over the term will exceed the compounded annual guarantee over the term. As the odds increase that the index-linked earnings will exceed the compounded annual guarantee, the estimated cost of the guarantee decreases, which translates into a maximized hedged investment budget.

In accordance with another aspect of the present invention, the hedged investment may comprise a purchase of a plurality of at-the-money call options and a sale of a plurality of call options having a strike price that is out-of-the-money by an amount equal to the annual capped growth rate. Other types of hedged investments are also possible. For example, the hedged investment may be designed to yield the greater of the annual guarantee or a percentage gain attributable to the index.

According to another aspect of the present invention, the cost of the annual guarantee may be estimated using a historical analysis method. A historical analysis method may comprise a back-casting of a historical performance rate of the index over an analysis period to estimate the cost of the annual guarantee during a plurality of hypothetical terms of the index-linked life insurance product.

In accordance with another aspect of the invention, an index-linked life insurance product has an annual guarantee and one or more of the following features: an annual minimum growth rate, an annual capped growth rate and a participation rate. A method for implementing such an index-linked life insurance product involves determining an estimated cost of the annual guarantee based on one or more features of the index-linked life insurance product. Funds amounting to a fixed income yield generated by investing a portion of a premium payment in a fixed income investment are allocated, after possibly deducting a product spread, to a crediting budget. A hedged investment budget is determined by deducting from the crediting budget the estimated cost of the annual guarantee. The deducted estimated cost of the annual guarantee may be allocated to a risk fund and the hedged investment budget may be allocated to a hedged investment in order to generate proceeds for supporting the index-linked earnings to be credited to the index-linked life insurance product.

In accordance with yet another aspect of the invention, a method is provided for implementing an index-linked life insurance product whereby at least a portion of a premium payment is allocated to a fixed income investment and an amount of annual fixed income to be yielded by the fixed income investment is projected. An estimated cost of an annual guarantee for the index-linked life insurance product is determined based on a historical analysis or another analysis method. A hedged investment budget is determined by subtracting from the projected amount of annual fixed income the estimated cost of the annual guarantee and a product spread. The hedged investment budget is then allocated to a hedged investment in order to generate proceeds that may be used to support index-linked earnings to be credited to the index-linked life insurance product.

A segment within the index-linked product may be created having a term, an annual guarantee, and one or more features comprising an annual minimum growth rate, an annual capped growth rate and a participation rate. An initial index value is determined at the beginning of the term. At the end of each one-year period for the duration of the term, the performance rate of the index is determined, any proceeds generated by the hedged investment are realized, and a current segment value is determined by crediting the initial segment an amount based on the index-linked comprising the greater of the annual minimum growth rate or the performance rate of the index limited by the annual capped growth rate. One or more features of the segment, such as the annual minimum growth rate or the annual capped growth rate, may optionally be reset at the end of each one-year period. The segment may also have a participation rate, in which case the current segment value is determined by crediting to the segment the greater of the annual minimum growth rate or the performance rate of the index times the participation rate limited by the annual capped growth rate. At the end of the term, or upon early termination or death, if the current segment value does not amount to at least the annual guarantee compounded over the term, funds from the risk fund are used to increase the amount credited to the segment to be equal to the compounded annual guarantee.

These and other aspects, features and advantages of the present invention will become apparent upon a reading of the following description of certain exemplary embodiments and with reference to the accompanying drawings.

DETAILED DESCRIPTION OF EXEMPLARY EMBODIMENTS OF THE INVENTION

Figure 1:
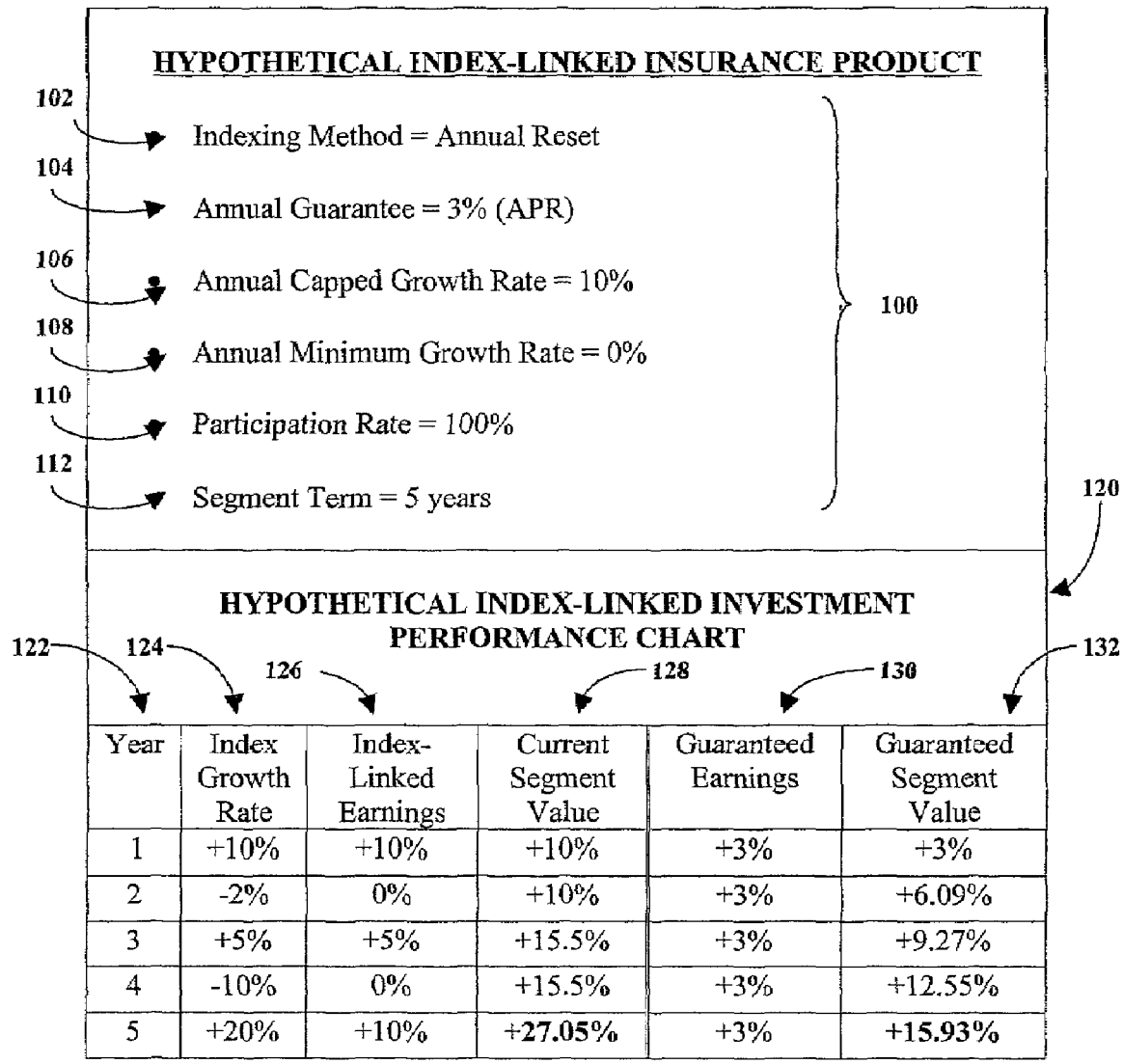
FIG. 1 is a table illustrating an exemplary index-linked life insurance product and a hypothetical performance chart therefor in accordance with an exemplary embodiment of the present invention.

The present invention relates to maximizing a hedged investment budget associated with an index-linked life insurance product, while also setting aside sufficient funds to cover a minimum annual guaranteed interest rate (herein referred to as an "annual guarantee.") In accordance with an exemplary embodiment of the present invention, the amount of funds set aside to cover an annual guarantee (such funds are also referred to herein as the "guaranteed return budget") is determined based on an estimate of the cost of the annual guarantee over a particular term. The cost of an annual guarantee is contemplated as being the amount of funds that the insurance company will have to produce (over and above any index-linked earnings to be credited under the terms of the index-linked life insurance product) in order to credit the insured with finds in the amount of the annual guarantee.

As is well known in the art, an index-linked life insurance product is credited with index-linked interest earnings that are linked to the performance of an external equity market index. One of the most commonly known equity market indices is the Standard & Poor's 500 Composite Stock Price Index ("S&P 500 Index"). Many other equity market indices are well known to those of ordinary skill in the art. The present invention contemplates the use of any equity market index in the administration of an index-linked life insurance product. Those skilled in the art will appreciate that an index-linked life insurance product may include several segments, each of which may have its own term and annual guarantee. For example, an index-linked life insurance product, or a segment thereof, may be designated as having a five-year term. Thus, at the end of its five-year term, the index-linked product (or segment) will have earned at least a minimum compounded annual percentage rate equivalent to the specified annual guarantee.

In addition to an annual guarantee, an index-linked life insurance product may include a number of other features. One feature of an index-linked life insurance product is the indexing method used to calculate index-linked earnings. The indexing method is the approach used to measure the performance of the equity market index. Some of the most common indexing methods known in the art include annual reset indexing (ratcheting), high-water mark indexing and point-to-point indexing. According to annual reset indexing, index-linked earnings, if any, are added to the index-linked life insurance product each year in proportion to any gain in the index value. According to high-water mark indexing, index-linked earnings, if any, are added to the index-linked life insurance product at the end of the term based on the difference between the highest index value during the term (typically using anniversary index values only) and the initial index value at the start of the term. According to point-to-point indexing, index-linked earnings, if any, are added to the index-linked life insurance product at the end of the term based on the difference between the index value at the end of the term and the initial index value at the start of the term. Those skilled in the art will appreciate that the principles of the present invention are not limited by the type of indexing method chosen for an index-linked life insurance product.

Another feature of an index-linked life insurance product is its participation rate. A participation rate dictates the percentage of the index gains that will be used to calculate index-linked earnings for the index-linked life insurance product. For example, if the index yields a gain of 10% and the participation rate is set at 80%, the index-linked life insurance product will be credited with index-linked earnings of 8% (10%×80%=8%). A participation rate is typically guaranteed for a specific period (e.g., ranging from one year to the entire term of the index-linked life insurance product). When that period is over, the insurance company may set a new participation rate for the next period.

An annual capped growth rate is another feature that may be associated with an index-linked life insurance product. An annual capped growth rate represents the maximum rate of index-linked earnings that will be credited to the index-linked life insurance product per year, regardless of the performance of the index. Similarly, an index-linked life insurance product may include an annual minimum growth rate. An annual minimum growth rate represents the minimum index-linked earnings that will be credited to the index-linked life insurance product per year, regardless of the performance of the index. An annual minimum growth rate is also known as a "floor." As an illustration, an annual minimum growth rate of 0% assures that even if the index decreases in value during the year, the index-linked earnings credited to the index-linked life insurance product will be zero and not negative.

Those skilled in the art will appreciate that the principles of the present invention may be applied to any type of index-linked life insurance product, regardless of the particular features thereof. Accordingly, any descriptions herein with respect to particular types of index-linked life insurance product having particular features are to be understood as being with reference to exemplary embodiments of the present invention only.

The following description will hereinafter refer to the drawings, in which like numerals indicate like elements throughout the several figures. FIG. 1 is a table illustrating an exemplary index-linked life insurance product 100 and a hypothetical performance chart 120 therefor. The exemplary index-linked life insurance product 100 described with respect to FIG. 1 will serve as a discussion example throughout the remainder of this specification. However, those skilled in the art will recognize that the principles of the present invention may by employed with many other types of index-linked life insurance product. Accordingly, the exemplary index-linked life insurance product 100 described herein should in no way be viewed as a limitation of the scope of the present invention.

The exemplary index-linked life insurance product 100 includes features comprising an annual reset indexing method 102, an annual guarantee 104 of 3%, an annual capped growth rate 106 of 10%, an annual minimum growth rate 108 of 0% and a participation rate 110 of 100%. The annual capped growth rate 106, the annual minimum growth rate 108 and the participation rate 110 may each be modified on an annual basis, if necessary. However the example of FIG. 1 assumes that all features of the index-linked life insurance product remain constant over its 5-year segment term 112. In general the annual capped growth rate 106 may be determined based on the hedged investment budget of the segment and the net cost of the hedged investment. Thus, the greater the hedged investment budget, the higher the annual capped growth rate 106 may be. Relatively higher interest rate environments tend to allow higher annual capped growth rates 106. The net cost of a hedged investment, such as one involving the purchase and sale of options, may be influenced by treasury rates, implied volatility of the equity market to which the index-linked life insurance product is linked, and dividend yield on the underlying stocks that make up the equity market index. Generally, option prices increase as interest rates and implied volatility increase. Conversely, options prices tend to decrease as dividend yields increase.

The hypothetical performance chart 120 illustrates the hypothetical performance of a segment of the exemplary index-linked life insurance product 100 for each year 122 of the hypothetical 5-year term 112. For each year 122, the hypothetical performance chart 120 tracks the hypothetical index growth rate 124 relative to an initial index value, the index-linked earnings 126 to be credited to the segment, the current segment value 128, the guaranteed earnings 130 attributable to the annual guarantee, and the guaranteed segment value 132. As shown, the annual guarantee 104 of 3% (compounded) will amount to a guaranteed segment value 132 of +15.93% at the end of the 5-year term 112. Based on the annual reset indexing method 102, the annual capped growth rate 106 of 10%, the annual minimum growth rate 108 of 0% and the participation rate 110 of 100%, the segment will achieve a current segment value 128 of +27.05% at the end of the 5-year term 112.

More precisely, in year 122 1 index-linked earnings 126 of +10% are to be credited to the current segment value 128 because the index growth rate 124 of +10% times the participation rate 110 of 100% is less than or equal to the annual capped growth rate 106 of 10%. In year 122 2, index-linked earnings 126 of 0% are credited to the current segment value 128 (i.e., the current segment value 128 remains at +10%) because the index growth rate 124 of −2% times the participation rate 110 of 100% is less than the annual minimum growth rate 108 of 0%. In year 122 3 index-linked earnings 126 of +5% (compounded) are credited to the current segment value 128 because the index growth rate 124 of +5% times the participation rate 110 of 100% is less than or equal to the annual capped growth rate 106 of 10%. In year 122 4, index-linked earnings 126 of 0% are credited to the current segment value 128 (i.e., the current segment value 128 remains at 15.5%) because the index growth rate 124 of −10% times the participation rate 110 of 100% is less than the annual minimum growth rate 108 of 0%. Lastly, in year 122 5 index-linked earnings 126 of +10% (compounded) are credited to the current segment value 128 because the index growth rate 124 of +20% times the participation rate 110 of 100% is greater than the annual capped growth rate 106 of +10%.

It may be seen that in certain years 122 (e.g., year 2 and year 4), the guaranteed earnings 130 are greater than the index-linked interest 126. However, in accordance with the present invention the determination as to whether the guaranteed earnings 130 are to be credited to the segment is not made until the end of the term 112 (or until death or early surrender, if applicable). Thus, in accordance with the features of the exemplary index-linked life insurance product 100, the current segment value 128 of +27.05% at the end of the term 112 is credited to the segment as opposed to the guaranteed segment value 132 of +15.93%. Furthermore, in the example provided, even though the index growth rate 124 under-performs the annual guarantee 104 in two of the exemplary years, the current segment value 128 at the end of each of those years is actually greater than the guaranteed segment value 132 at that point in time. Those skilled in the art will appreciate that a hedged investment may be established in order to generate proceeds that are substantially equal to the index-linked earnings 126.

Figure 2:
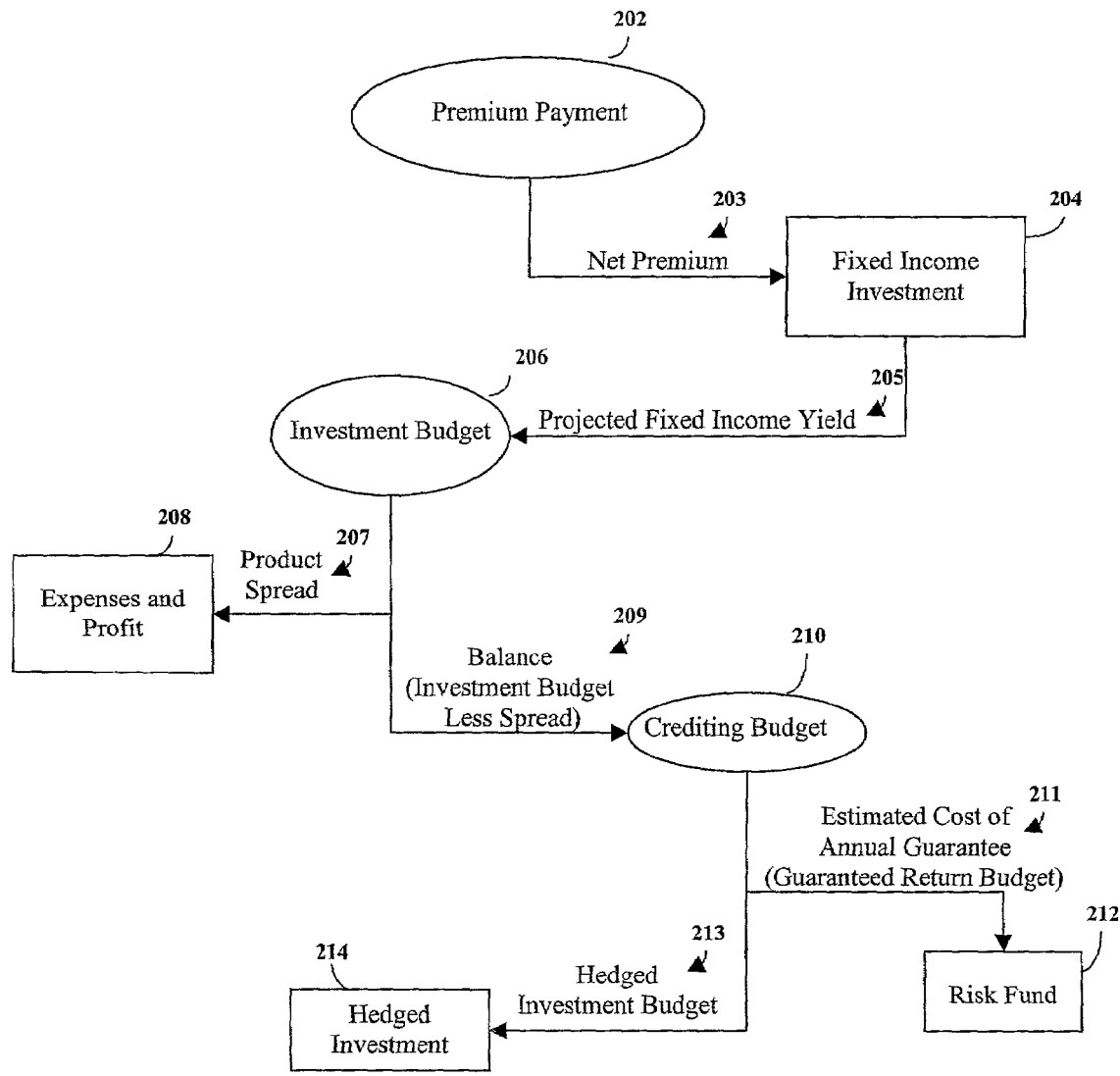
FIG. 2 is a block diagram generally illustrating the apportionment and allocation of premium payments in accordance with an exemplary index-linked life insurance product of the present invention.

FIG. 2 is a block diagram generally illustrating the apportionment and allocation of funds within an exemplary index-linked life insurance product 100 of the present invention. As shown, a premium payment 202 may be periodically made in relation to the exemplary index-linked life insurance product 100. A portion of the premium payment 202 may be allocated to premium loads or other costs, expenses or fees. After any initial deductions are taken from the premium payment 202, the net premium payment 203 may be invested in a fixed income investment, such as securities involving bonds or mortgages, Treasury bills, term deposits, etc.

Fixed income yield 205 from the fixed income investment 204 may be used as an investment budget 206. A product spread 207 and any other administrative fees may be deducted from the investment budget 206. The concept of a product spread 207 is well-known in the art and generally refers to a relatively small percentage of the investment budget 206 that is deducted and allocated to the insurance company (e.g., in order to cover expenses or profits 208). The balance 209 of the investment budget is referred to herein as the crediting budget 210. The crediting budget 210 is used to generate proceeds that will support the index-linked earnings to be credited to the exemplary index-linked life insurance product 100.

In order to generate the proceeds that will support the index-linked earnings to be credited to the index-linked life insurance product, the insurance company may initiate a hedged investment 214. A hedged investment 214 may, for example, involve buying and selling options for shares in the equity market index. Typically, the hedged investment budget 213 is equal to the crediting budget 210 less a guaranteed return budget. In accordance with an exemplary embodiment of the present invention, the guaranteed return budget is equal to an estimated cost of the annual guarantee 211. The estimated cost of the annual guarantee 211 may be determined by back-casting the performance of the equity market index relative to the features of the index-linked life insurance product 100.

By way of example, the exemplary index-linked life insurance product 100 is administered using annual reset indexing and has an annual minimum growth rate, an annual capped growth rate, a participation rate, an annual guarantee and a term. Under the framework of the exemplary index-linked life insurance product 100, a historical analysis may be performed in order to determine the average amount, if any, by which the equity index under-performed the annual guarantee during an analysis period. In other words, the estimated cost of the annual guarantee 211 is the average amount of funds that the insurance company will have to provide, over and above any index-linked earnings (supported by proceeds from the hedged investment) in order to credit the index-linked life insurance product with funds equal to the amount of the annual guarantee. An exemplary method for determining an estimated cost of an annual guarantee 211 will be more fully explained below with reference to FIG. 3 and FIG. 4. The estimated cost of an annual guarantee 211 for multiple products may be pooled in a risk fund 212 maintained by the insurance company for the purpose of covering annual guarantees on a plurality of such products, when needed. The hedged investment budget 213 may be allocated to a hedged investment 214 in order to generate proceeds that will support the index-linked earnings to be credited under the terms of the index-linked life insurance product 100.

Figure 3:
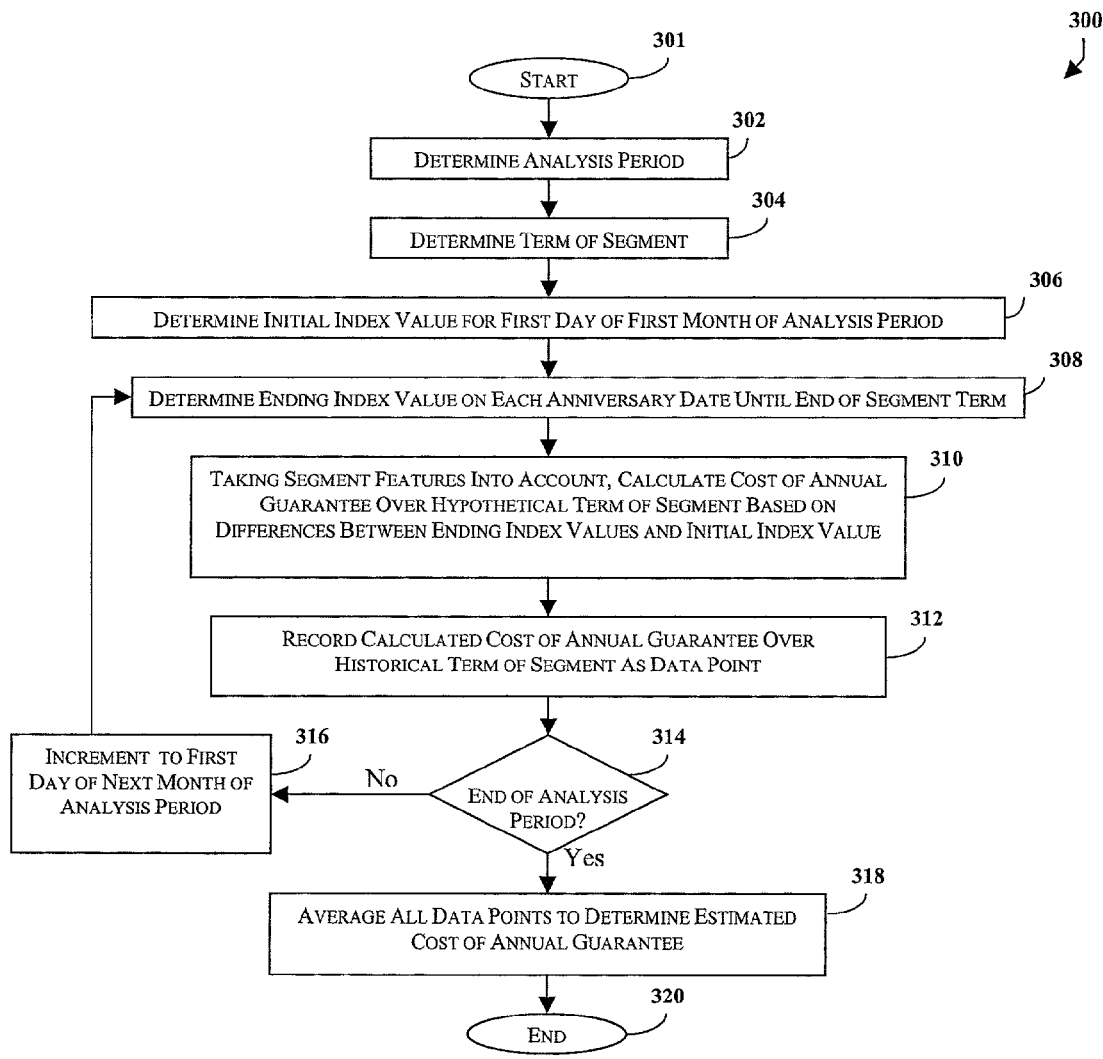
FIG. 3 is a flow chart illustrating an exemplary method for determining an estimated cost of an annual guarantee in accordance with an exemplary embodiment of the present invention.

FIG. 3 is a flow chart illustrating an exemplary method for determining an estimated cost of an annual guarantee 211 using a historical analysis method in accordance with an exemplary embodiment of the present invention. The exemplary method 300 begins at starting block 301 and advances to step 302, where the analysis period is determined. The analysis period may be any period of time in which historical performance data is available for the chosen equity market index. For example, historical performance data is available for the S&P 500 index dating back at least as far as Jan. 1, 1950, so the analysis period may be set as Jan. 1, 1950 to the first day of a recent month. At step 304, the historical term of each segment of the index-linked life insurance product is determined. As is known in the art, an index-linked life insurance product may have a particular duration, such as the life of the insured, while segments of the index-linked life insurance product may have discrete terms (e.g., 5 years.)

Next at step 306, the initial index value on the first day of the first month of the analysis period is determined. At step 308, an index value is determined on each anniversary date until the end of the segment term. By way of example, if Jan. 1, 1950 is chosen as the first day of the first month of the analysis period and the segment term is 5 years, the index values would be determined on the anniversary dates of Jan. 1, 1951, Jan. 1, 1952, Jan. 1, 1953, Jan. 1, 1954 and Jan. 1, 1955. Taking the features of the index-linked life insurance product into account, such as the indexing method, a specified annual minimum growth rate, an annual capped growth rate and a participation rate, the cost that would be incurred (after taking into account the index-linked earnings) if a certain annual guarantee had been offered during that specified historical term may be calculated at step 310 using the initial index value and the subsequent anniversary index values within the historical term. Again, the estimated cost of the annual guarantee is contemplated as being the amount of funds that the insurance company will have to provide over and above any index-linked earnings (supported by proceeds from a hedged investment) in order to credit the segment with funds in the amount of the annual guarantee. As a simple example, assume (1) an annual guarantee of +3%, compounding to a guaranteed interest rate of +15.93% over a 5 year term, (2) an index gain of +15.9% over the 5 year term, (3) a participation rate of 100% resulting in index-linked earnings of +15.9% over the 5 year term, and (4) a hedged investment designed to generate proceeds that match the index-linked earnings. Based on these assumptions, the insurance company would have to provide an additional +0.03% in excess of the proceeds generated by the hedged investment in order to cover the +3% annual guarantee over the 5 year term.

At step 312, the estimated cost of the annual guarantee over the historical term of the segment is recorded as a data point. Then at step 314, a determination is made as to whether the end of the analysis period has been reached. If the end of the analysis period has not been reached, an initial index value on the first day of the next month of the analysis period is determined at step 316. After incrementing to the next month for calculation of a new initial index value, the method returns to step 308 for a determination of the index values on each subsequent anniversary date until the end of the next historical segment term. Those skilled in the art will appreciate that the analysis period may be expressed in units other than years with monthly increments. For example, an analysis period may be expressed as a number of months, weeks, or days, etc. Similarly, data points may be calculated in increments of weeks, days, etc. Again, following step 308 the method proceeds to step 310 for a calculation of the cost of the annual guarantee over the next historical term of the segment. This calculated cost of the annual guarantee may be recorded as another data point at step 312. When it is finally determined that the end of the analysis period has been reached at step 314, the average of all data points is calculated at step 318 to determine an estimated cost of the annual guarantee based on the historical data. After determination of the estimated cost of the annual guarantee, the method ends at step 320.

Figure 4:
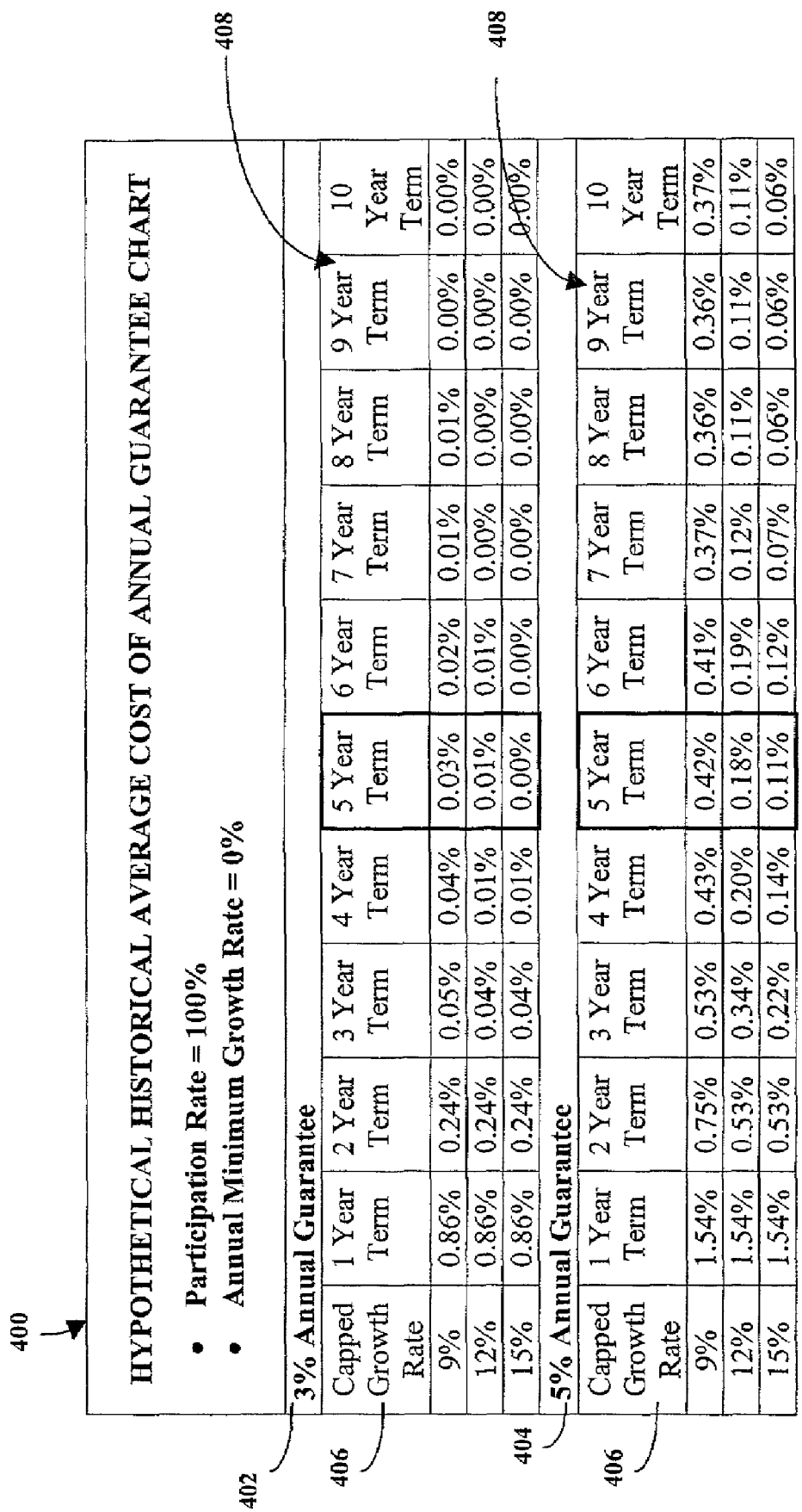
FIG. 4 is a table illustrating hypothetical estimated costs of various annual guarantees determined through historical analysis in accordance with an exemplary embodiment of the present invention.

FIG. 4 is a table 400 illustrating hypothetical estimated costs of a 3% annual guarantee 402 and a 5% annual guarantee 404. The table 400 may have been compiled according to the exemplary method for determining an estimated cost of an annual guarantee described above with reference to FIG. 3. Those skilled in the art will appreciate, however, that other methods for determining an estimated cost of an annual guarantee may also be possible. The present invention is therefore intended to encompass any analysis method for determining estimated costs of an annual guarantee. Those skilled in the art will appreciate that the foregoing analysis utilizes a simplifying assumption that the insu company will need to supplement index-linked earnings with amounts from the risk fund only at the end of the specified term. As in known in the art, however, the compounded annual guarantee is typically compared to the current account value upon death or surrender of the product, which may occur prior to the end of the term. A more precise estimate of the cost of the annual guarantee would take into account the actuarial decrement from such deaths and surrenders prior to the end of the term. For the sake of simplicity, however, that analysis is not illustrated herein.

The table 400 assumes an index-linked life insurance product that employs annual reset indexing and has an annual minimum growth rate (0%), an annual capped growth rate, a participation rate (100%), an annual guarantee and a term. The estimated costs of the 3% annual guarantee 402 and the 5% annual guarantee 404 are calculated for multiple capped growth rates 406 and multiple segment terms 408. With focus on a 5-year term, it may be seen that the estimated cost of the 3% annual guarantee ranges from 0.03% (for a 9% capped growth rate) to 0.00% (for a 15% capped growth rate). Similarly, the estimated cost of the 5% annual guarantee over a 5-year term ranges from 0.42% (for a 9% capped growth rate) to 0.11% (for a 15% capped growth rate). As demonstrated, the higher the capped growth rate, the lower the estimated cost of the annual guarantee is likely to be. As is also shown in the table 400, the estimated cost of the annual guarantee decreases as the length of the segment term 408 increases.

Accordingly, as shown by way of example only with reference to FIG. 3 and FIG. 4, an exemplary embodiment of the present invention contemplates that a historical analysis or other analysis method may be performed in order to more precisely estimate the cost of a certain annual guarantee. By more precisely estimating the cost of an annual guarantee, the insurance company is able to more precisely estimate the percentage of the crediting budget that is to be deducted as a guaranteed return budget for covering the risk associated with the annual guarantee. In many cases, a more precise estimation of the cost of an annual guarantee will translate into a relatively smaller guaranteed return budget and thus a maximized hedged investment budget.

Figure 5:
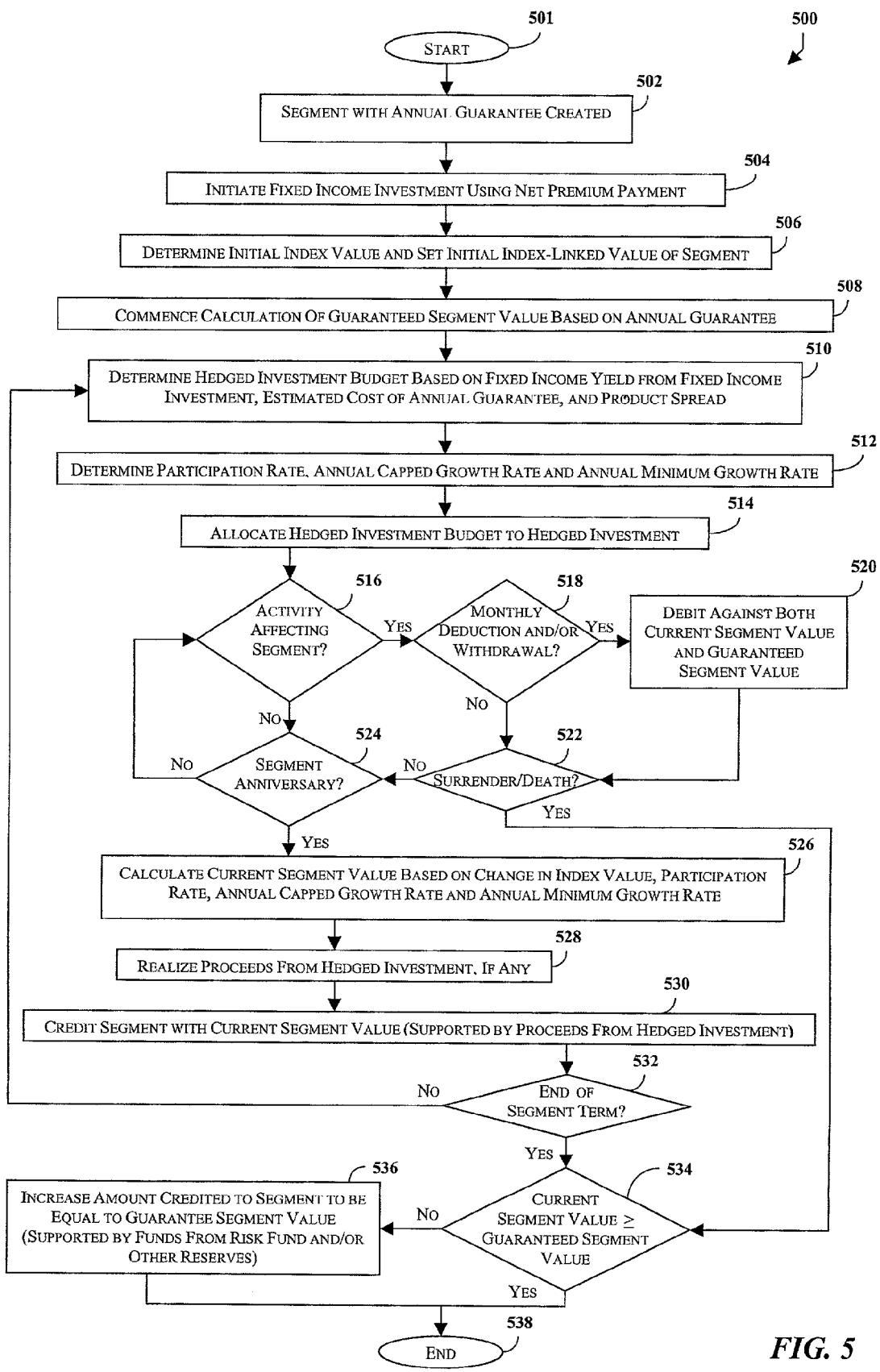
FIG. 5 is a flow chart illustrating segment processing for an index-linked life insurance product in accordance with an exemplary embodiment of the present invention.

FIG. 5 is a flow chart illustrating segment processing for an index-linked life insurance product in accordance with an exemplary embodiment of the present invention. The segment processing method 500 begins at starting block 501 and advances to step 502, where a segment with an annual guarantee is created within the index-linked life insurance product. Each segment of the index-linked life insurance product has a term, which is usually a number of years.

Next at step 504, a net premium payment for the segment is invested in a fixed income investment. A fixed interest investment may be an investment in securities involving bonds or mortgages, or Treasury bills, bonds, term deposits, or the like. Investing the entirety of the net premium payment in the fixed interest investment supports the index-linked life insurance product's guaranteed principle. As will be explained below, an exemplary embodiment of the present invention contemplates that an investment budget may be determined based on the projected fixed income yield of the fixed income investment. However, those skilled in the art will appreciate that a more precise calculation would take into account the hedged investment budget in projecting the fixed income yield of the fixed income investment because the hedged investment budget will be invested at the same time the fixed income investment is made.

At step 506, the initial index value is determined and the initial segment value is established. Many equity market indices are well known to those of ordinary skill in the art. The S&P 500 index is a popular index for which performance data is widely available. The initial index value is the index number (e.g., of the S&P 500 index) on the first day of the term of the segment. As will be explained below, earning will be credited to the segment value based on changes in the index value.

At step 508, the guaranteed segment value is calculated based on the annual guarantee. As will be understood by those of skill in the art, the annual guarantee may be expressed as a daily compounded interest rate. Therefore, the guaranteed segment value may be calculated at any point during the term of the segment.

At step 510, the hedged investment budget is determined based on the projected fixed income from the fixed interest investment, the estimated cost of the annual guarantee and the product spread associated with the index-linked life insurance product. As was discussed above, the estimated cost of the annual guarantee may, in one embodiment, be calculated by back-casting the performance of the equity market index in relation to the features of the particular index-linked life insurance product (see description of FIG. 3, above). The product spread associated with the index-linked life insurance product represents a percentage of the investment budget that is to be allocated to expenses and profits of the insurance company. The product spread is deducted from the investment budget to create a crediting budget. The estimated cost of the annual guarantee is deducted from the crediting budget to form the hedged investment budget.

At step 512, the participation rate, annual capped growth rate and annual minimum growth rate are determined for the segment. The participation rate represents the percentage of the up-side index performance that may be credited to the segment. For example, given a participation rate of 50% and an index performance gain of +10%, the segment may be credited with index-linked interest of +5%. The insurance company may set the participation rate to be less than 100%. The annual capped growth rate of the segment represents the maximum amount of annual index-linked earnings that may be credited to the segment. For example, given a participation rate of 100%, an annual capped growth rate of +10%, and an index performance gain of +15%, the segment may be credited with index-linked earnings of +10%. The annual minimum growth rate represents the minimum amount of annual index-linked earnings that may be credited to the segment. As an example, the insurance company may set the minimum growth rate at 0% so that the index-linked earnings credited to the segment in a year will be zero and not negative even if the index declines in value. The level of the annual capped growth rate, the participation rate and the annual minimum growth rate are interrelated and are typically dictated by the amount of hedged investment that will be used to support the index-linked earnings. These features are typically adjustable each year during the segment term, often subject to certain maximums and minimums.

At step 514, the hedged investment budget is allocated to a hedged investment. Hedged investments may take many forms that are well known in the art. An exemplary hedged investment may be structured as an at-the-money hedge. By way of example only, one possible hedged investment may involve using the hedged investment budget to purchase call options having a strike price of the current index value (i.e., "at-the-money") and simultaneously selling an equal number of call options having a strike price that is above the current index value by an amount equal to the annual capped growth rate. As an illustration, given a current index value of 1500 and an annual capped growth rate of 10%, a number of call options may be purchased having a strike price of 1500 and a number of call options may be sold having a strike price of 1650. Another example of a hedged investment may involve using the hedged investment budget to trade in futures and to purchase put options to manage down-side risk.

At step 516, a determination is made as to whether any activity has occurred that affects the segment. The insurance company may establish a basic interest account for the insured, in which the insured may be required to maintain a minimum balance for the insured. Therefore certain activities (e.g., withdrawals and/or deductions, etc.) regarding the index-linked life insurance product may occur with respect to the basic interest account and without having any effect on the segment. Also, other segments may be established and an order of segment processing priority may be determined such that activity may affect one segment, but not this particular segment. If, however, an activity is detected that does affect the segment, a determination is made at step 518 as to whether a deduction or withdrawal has occurred.

If a deduction or withdrawal has occurred, the method advances to step 520 where the deduction and/or withdrawal is debited against both the current segment value and the guaranteed segment value. Following step 520, or if no deduction or withdrawal was detected at step 518, the method proceeds to step 522 for a determination as to whether the index-linked life insurance product has been surrendered (or in the case of a life insurance policy, whether the death of the insured has occurred.) Upon a determination of surrender or death at step 522, the method proceeds to step 534 where it is determined whether the current segment value is at least equal to the guaranteed segment value. If the current segment value is at least equal to the guaranteed segment value, the method ends at step 538. However if it is determined at step 534 that the current segment value is less than the guaranteed segment value, the amount credited to the segment is increased to be equal to the guaranteed segment value at step 536. In order to support the increased credit, the insurance company may utilize funds from the risk fund and/or other reserves. The risk fund may be under-funded in the event that death or surrender occurs prior to the expected end of the segment term, unless the estimated cost of the annual guarantee reflects actuarial decrements of surrender and death, as noted above.

If no activity affecting the segment was detected at step 516 or if no surrender or death was detected at step 522, the method progresses to step 524 where it is determined whether the segment anniversary has occurred. If the segment anniversary has not occurred, the method is repeated from step 516, as described previously, until a segment anniversary is detected at step 524. Upon detection of a segment anniversary, the current segment value is calculated (or recalculated) based on the performance of the index, the participation rate, the annual capped growth rate, and the annual minimum growth rate at step 526. Then, any proceeds generated by the hedged investment are realized at step 528. At step 530, the segment is credited with the current segment value (supported by proceeds generated by the hedged investment).

At step 532, a determination is made as to whether the end of the segment term has been reached. If the end of segment term has not been reached, the method returns to step 510, where a hedged investment budget is redetermined. From step 508, the method progresses as previously described until the end of the segment term is detected at step 532.

When the end of the segment term is detected at step 532, the method advances to step 534, where it is determined whether the current segment value is at least equal to the guaranteed segment value. If the current segment value is at least equal to the guaranteed segment value, the method ends at step 538. However if it is determined at step 534 that the current segment value is less than the guaranteed segment value, the amount credited to the segment is increased to be equal to the guaranteed segment value at step 536. In order to support the increased credit, the insurance company may utilize funds from the risk fund and/or other reserves. Following step 536, the method ends at step 538.

Figure 6:
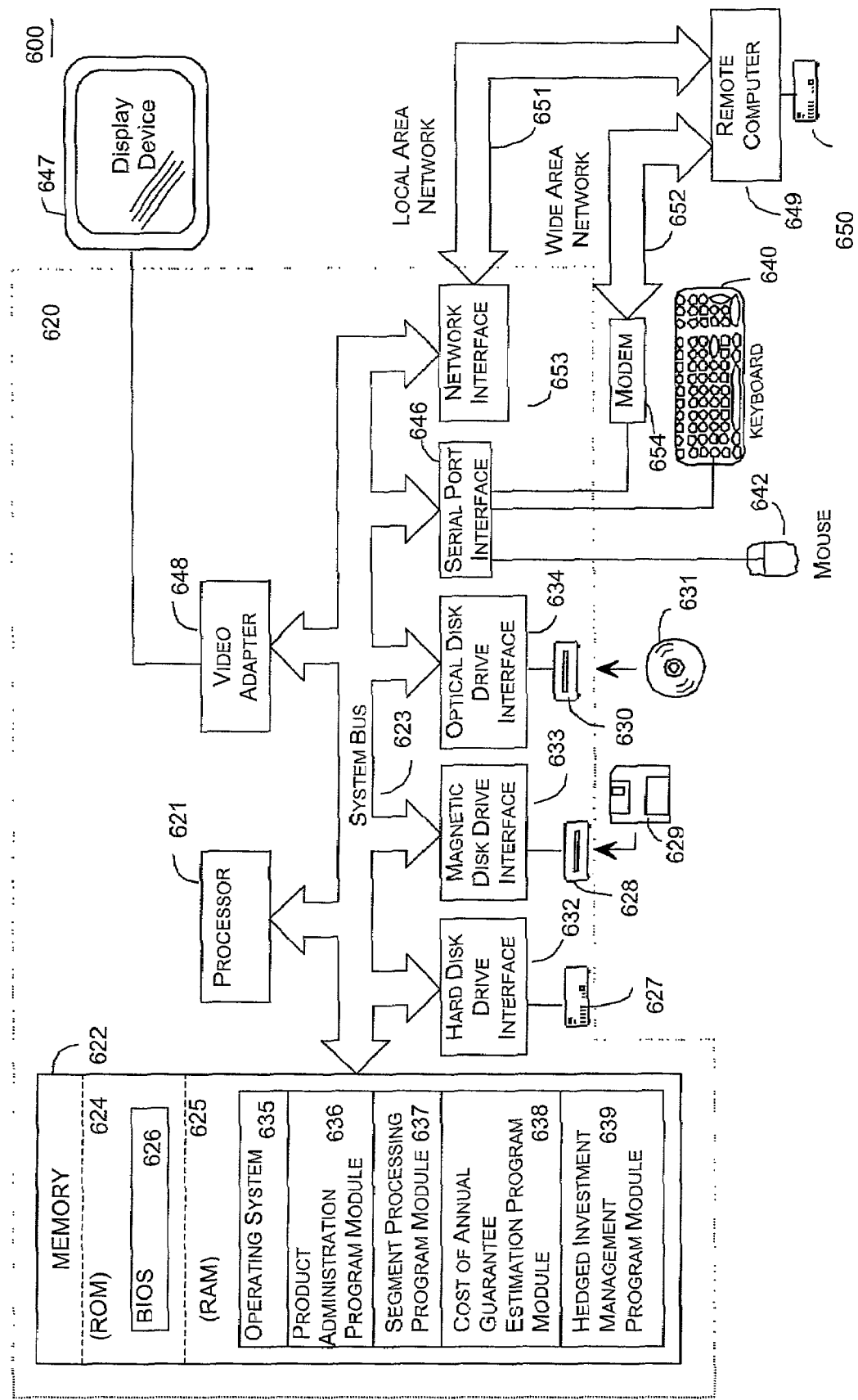
FIG. 6 is a block diagram illustrating an exemplary computing environment for implementing one or more aspects of the present invention.

Those skilled in the art will recognize that methods for implementing an index-linked life insurance product in accordance with the present invention may be implemented in whole or in part by way of one or more computer systems. FIG. 6 and the following discussion are intended, by way of example only, to provide a brief and general description of a suitable computing environment for implementing the present invention. Although the system shown in FIG. 6 represents a conventional personal computer system 600, those skilled in the art will recognize that the invention also may be implemented using other types of computer system configurations. The computer system 600 includes a processing unit 621, a system memory 622 and a system bus 623 that couples the system memory 622 to the processing unit 621. The system memory 622 includes read only memory (ROM) 624 and random access memory (RAM) 625. A basic input/output system 626 (BIOS), containing basic routines that help to transfer information between elements within the personal computer system 600, such as during start-up, is stored in ROM 624.

The personal computer system 600 further includes a hard disk drive 627, a magnetic disk drive 628, e.g., to read from or write to a removable disk 629, and an optical disk drive 630, e.g., for reading a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage for the personal computer system 600. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules may be stored in the persistent storage devices (e.g., hard disk drive 627) and the memory 622 (e.g., RAM 625), including an operating system 635. As will be apparent to those of ordinary skill in the art, the present invention may be implemented through one or more program modules comprising computer-executable instructions for performing one or more of the various method of the invention. By way of illustration only, various embodiment of the invention may be implemented using a Product Administration program module 636 for administering an index-linked life insurance product of the present invention, a Segment Processing program module 637 for processing segments within an index-linked life insurance product of the present invention (may be a included within the Product Administration program module 636), a Cost of Annual Guarantee Estimation program module 638 for determining an estimated cost of an annual guarantee in accordance with the present invention, and/or a Hedged Investment Management program module 639 for managing hedged investments. As will be appreciated by those of skill in the art, the present invention may be implemented using these and/or other program modules and any combination thereof. Those skilled in the art will also appreciate that a computer-readable medium may comprise a memory storage medium, a propagated data signal, etc.

Other input devices (not shown) may include a microphone, satellite dish, scanner, or the like. These and other input devices are often functionally coupled to the processing unit 621 through a serial port interface 646 that is coupled to the system bus 623, but may be connected by other interfaces, such as a game port or a universal serial bus (USB). A display device 647 is also connected to the system bus 623 via an interface, such as a video adapter 648. In addition to display device, personal computer systems typically include other peripheral output devices (not shown), such as speakers or printers.

The personal computer system 600 may operate in a networked environment using logical connections to one or more remote computer systems, such as a remote computer system 649. The remote computer system 649 may be a server, a mainframe, a router, a peer device or other common network node, and typically includes many or all of the elements described above relative to the personal computer system 600, although only a storage device 650 has been illustrated in FIG. 6. The logical connections depicted in FIG. 6 include a local area network (LAN) 651 and a wide area network (WAN) 652. Such networking environments are commonplace in offices, enterprise-wide computer networks, intranets and the Internet.

When used in a LAN networking environment, the personal computer system 600 is connected to the LAN 651 through a network interface 653. When used in a WAN networking environment, the personal computer system 600 typically includes a modem 654 or other means for establishing communications over the WAN 652, such as the Internet. The modem 654, which may be internal or external, is connected to the system bus 623 via the serial port interface 646. In a networked environment, program modules depicted relative to the personal computer system 600, or portions thereof, may be stored in the remote memory storage device. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 653.

Based on the foregoing, it will be appreciated that the present invention relates to an index-linked life insurance product implemented in such a manner as to maximize a hedged investment budget, while also setting aside sufficient funds to cover an annual guarantee. Various methods for implementing an index-linked life insurance product in accordance with the present invention have been described herein by way of example only. Many other modifications, features, embodiments and operating environments of the present invention will become evident to those of skill in the art. It should be appreciated that many aspects of the present invention were described above by way of example only and are, therefore, not intended as required or essential elements of the invention. It should be understood, therefore, that the foregoing relates only to certain embodiments of the invention, and that numerous changes may be made therein without departing from the spirit and scope of the invention as defined by the following claims.

What is claimed is:

1. A method for implementing an index-linked life insurance product having a term and an annual guarantee, comprising:

allocating at least a portion of a premium payment associated with the index-linked life insurance product to a fixed income investment and projecting an annual fixed income yield for the fixed income investment;

determining a hedged investment budget based at least in part on the projected annual fixed income yield and an estimated cost of the annual guarantee over the term, wherein at least a portion of the estimated cost of the annual guarantee is allocated to a risk fund and wherein the term has a term length greater than one year;

allocating the hedged investment budget to a hedged investment linked to an index in order to generate proceeds for supporting an amount credited to the index-linked insurance product based on index-linked earnings;

determining the occurrence of a predetermined event where the amount credited based on the index-linked earnings is not equal to at least the annual guarantee compounded over the term; and upon the occurrence of a predetermined event where the amount credited based on the index-linked earnings is not equal to at least the annual guarantee compounded over the term, using funds from the risk fund to increase the amount credited to be substantially equal to the annual guarantee compounded over the term.

2. The method of claim 1, wherein the predetermined event may include expiration of the term, early surrender, or death.

3. The method of claim 1, wherein the term expires at death.

4. The method of claim 1, wherein the estimated cost of the annual guarantee comprises an estimate of the funds for increasing the index-linked earnings to approximately equal the annual guarantee compounded over the term.

5. The method of claim 1, wherein the estimated cost of the annual guarantee is determined, at least in part, through a historical analysis comprising a back-casting of a historical performance rate of the index over an analysis period to determine a cost of the annual guarantee during a plurality of hypothetical terms of the index-linked life insurance product.

6. The method of claim 1, wherein the index-linked insurance product further has one or more features, wherein the features may include at least one of an annual minimum growth rate, an annual capped growth rate, and a participation rate; and wherein the estimated cost of the annual guarantee comprises an estimate of the funds for increasing the index-linked earnings to approximately equal to the annual guarantee compounded over the term, taking into account the features of the index-linked insurance product.

7. The method of claim 6, wherein one or more of the features of the index-linked insurance product is selectively reset each year during the term.

8. The method of claim 1, wherein determining the hedged investment budget includes deducting from the projected annual fixed income yield a product spread and the estimated cost of the annual guarantee.

9. The method of claim 8, further comprising, allocating the deducted estimated cost of the annual guarantee to the risk fund.

10. The method of claim 1, wherein the hedged investment comprises an at-the-money hedge.

11. The method of claim 1, the index-linked insurance product further comprises an annual capped growth rate; and wherein the hedged investment comprises a purchase of a plurality of at-the-money call options and a sale of a plurality of call options having a strike price that is out-of-the-money by an amount equal to the annual capped growth rate.

12. The method of claim 11, wherein the animal capped growth rate is selectively reset each year during the term.

13. The method of claim 1, wherein the hedged investment is designed to yield the greater of the annual guarantee or a percentage gain attributable to the index.

14. The method of claim 1, wherein the risk fund comprises funds deducted from a plurality of insurance products.

15. A method for implementing an index-linked life insurance product, comprising:

determining an investment budget by projecting a fixed income yield to be produced by investing a net premium payment in a fixed income investment;

creating a segment of the index-linked life insurance product having a term, wherein the term is comprised of a plurality of term periods, wherein the term has a term length greater than one year;

determining a hedged investment budget based at least in part on deducting from the investment budget an estimated cost of an annual guarantee over the term associated with the index-linked life insurance product, wherein at least a portion of the estimated cost of the annual guarantee is allocated to a risk fund;

allocating the hedged investment budget to a hedged investment designed to generate proceeds for supporting index-linked earnings to be credited to the index-linked life insurance product;

determining an initial index value;

at the end of each term period for the duration of the term, determining an index value for the ended term period, determining a current segment value by crediting to the segment an amount based on the index-linked earnings comprising a percentage difference between the index value for the ended term period and the initial index value, and realizing any proceeds generated by the hedged investment;

determining the occurrence of a predetermined event where the amount credited based on the index-linked earnings is not equal to at least the annual guarantee compounded over the term; and upon the occurrence of a predetermined event where the amount credited to the segment based on the index-linked earnings does not equal to at least the annual guarantee compounded over the term, using funds from the risk fund to increase the amount credited to the segment to be substantially equal to the annual guarantee compounded over the term.

16. The method of claim 15, wherein the predetermined event may include expiration of the term, early surrender, or death.

17. The method of claim 15, wherein the term expires at death.

18. The method of claim 15, wherein the length of each term period is one year.

19. The method of claim 15, wherein the index value for the ended term period is an anniversary index value.

20. The method of claim 15, wherein the estimated cost of the annual guarantee comprises an estimate of the hinds for increasing the amount credited to the segment to approximately equal the annual guarantee compounded over the term.

21. The method of claim 15, wherein the estimated cost of the annual guarantee is determined, at least in part, through a historical analysis comprising a back-casting of a historical performance rate of the index over an analysis period to determine a cost of the annual guarantee during a plurality of hypothetical terms of the index-linked life insurance product.

22. The method of claim 15, wherein the segment includes one or more features, wherein the features may include at least one of an annual minimum growth rate and an annual capped growth rate; and wherein determining a current segment value comprises crediting to the segment the amount based on the index-linked earnings comprising the greater of the annual minimum growth rate or the percentage difference between the index value for the ended term period and the initial index value limited by the annual capped growth rate.

23. The method claim 22, further comprising at the end of each term period for the duration of the term, selectively resetting one or more of the features of the segment.

24. The method of claim 22, wherein the segment further has a participation rate; and wherein determining the current segment value comprises crediting to the segment the amount based on the index-linked earnings comprising the greater of the annual minimum growth rate or the percentage difference between the index value for the ended term period and the initial index value times the participation rate limited by the annual capped growth rate.

25. The method of claim 15, wherein determining the hedged investment budget includes deducting from the projected annual fixed income yield a product spread and the estimated cost of the annual guarantee.

26. The method of claim 25, further comprising, allocating the deducted estimated cost of the annual guarantee to the risk fund.

27. The method of claim 15, wherein the hedged investment comprises an at-the-money hedge.

28. The method of claim 15, wherein the hedged investment comprises a purchase of a plurality of at-the-money call options and a sale of a plurality of call options having a strike price that is out-of-the-money by an amount equal to an annual capped growth rate.

29. The method of claim 28, wherein the annual capped growth rate is selectively reset each term period during the term.

30. The method of claim 15, wherein the hedged investment is designed to yield the greater of the annual guarantee or the percentage difference between the index value for the ended term period at expiration of the term and the initial index value, limited by any features of the segment.

31. The method of claim 15, wherein the risk fund comprises funds deducted from a plurality of insurance products.

32. A system for implementing an index-linked insurance product having a term comprised of a plurality of term periods, an annual guarantee and a hedged investment budget comprising:

an input device for inputting data to identify the term, the annual guarantee, and an estimated cost of the annual guarantee over the term, wherein the term has a term length greater than one year; and a processor functionally coupled to the input device for receiving the data and thereafter executing computer-executable instructions for:

monitoring index-linked earnings to be credited to the index-linked insurance product based on performance rate of an index, crediting an amount to the index-linked insurance product based on the index-linked earnings, the index-linked earnings being supported by proceeds generated by a hedged investment made using the hedged investment budget, wherein the hedged investment budget is determined based at least in part on allocating at least a portion of a premium payment to a fixed income investment and projecting an annual fixed income yield of the fixed income investment, and deducting from the projected annual fixed income yield the estimated cost of the annual guarantee, wherein at least a portion of the estimated cost of the annual guarantee is allocated to a risk fund, determining a guaranteed value of the index-linked insurance product based on the annual guarantee, determining the occurrence of a predetermined event where the amount credited based on the index-linked earnings is not equal to at least the annual guarantee compounded over the term, and upon the occurrence of a predetermined event where the amount credited based on the index-linked earnings does not equal to at least the guaranteed value, using finds from the risk fund to increase the amount credited to be substantially equal to the annual guarantee compounded over the term.

33. The method of claim 32, wherein the predetermined event may include expiration of the term, early surrender, or death.

34. The method of claim 32, wherein the term expires at death.

35. The method of claim 32, wherein the length of each term period is one year.

36. The system of claim 32, wherein the estimated cost of the annual guarantee comprises an estimate of the funds for increasing the index-linked earnings to approximately equal the annual guarantee compounded over the term.

37. The system of claim 32, wherein the estimated cost of the annual guarantee is determined through a historical analysis comprising a back-casting of a historical performance rate of the index over an analysis period to determine a cost of the annual guarantee during a plurality of hypothetical terms of the index-linked insurance product.

38. The system of claim 32, wherein the index-linked insurance product further has one or more features, wherein the features may include at least one of an annual minimum growth rate, an annual capped growth rate, and a participation rate; and
  wherein the estimated cost of the annual guarantee comprises an estimate of the funds for increasing the index-linked earnings to approximately equal to the annual guarantee compounded over the term, taking into account the features of the index-linked insurance product.

39. The system of claim 38, wherein one or more of the features of the index-linked insurance product is selectively reset each term period during the term.

40. The system of claim 32, wherein the hedged investment comprises an at-the-money hedge.

41. The system of claim 32, the determination of the hedged investment budget by the processor includes deducting from the projected annual fixed income yield a product spread and the estimated cost of the annual guarantee.

42. The system of claim 41, further comprising, allocating the deducted estimated cost of the annual guarantee to the risk fund.

43. The system of claim 32, wherein the index-linked insurance product further has an annual capped growth rate; and
  wherein the hedged investment comprises a purchase of a plurality of at-the-money call options and a sale of a plurality of call options having a strike price that is out-of the-money by an amount equal to the annual capped growth rate.

44. The system of claim 43, wherein the annual capped growth rate is selectively reset each term period during the term.

45. The system of claim 32, wherein the hedged investment is designed to yield the greater of the annual guarantee or a percentage gain attributable to the index.

46. The system of claim 32, wherein the risk fund comprises funds deducted from multiple insurance products.

47. The method of claim 1, wherein the estimated cost of the annual guarantee decreases as the term length increases.

48. The method of claim 15, wherein the estimated cost of the annual guarantee decreases as the term length increases.

49. The method of claim 24, further comprising at the end of each term period for the duration of the term, selectively resetting the participation rate of the segment.

50. The system of claim 32, wherein the estimated cost of the annual guarantee decreases as the term length increases.

51. A method for implementing an index-linked life insurance product having a term and an annual guarantee, comprising:
  allocating at least a portion of a premium payment associated with the index-linked life insurance product to a fixed income investment and projecting an annual fixed income yield for the fixed income investment;
  determining a hedged investment budget based at least in part on the projected annual fixed income yield and an estimated cost of the annual guarantee over the term, wherein the term has a term length greater than one year and wherein the estimated cost of the annual guarantee decreases as the term length increases;
  allocating at least a portion of the hedged investment budget to a hedged investment linked to an index in order to generate proceeds for supporting an amount credited to the index-linked insurance product based on index-linked earnings;
  determining an occurrence of a predetermined event where the amount credited to the index-linked life insurance product is not equal to at least the annual guarantee compounded over the term; and
  upon the occurrence of the predetermined event where the amount credited to the index-linked life insurance product is not equal to at least the annual guarantee compounded over the term, increasing the amount credited to the index-linked life insurance product to be substantially equal to the annual guarantee compounded over the term.

52. The method of claim 51, wherein the predetermined event may include expiration of the term, early surrender, or death.

53. The method of claim 51, wherein the amount credited to the index-linked life insurance product is supplied, at least in part, by a risk fund.

54. The method of claim 53, wherein a plurality of estimated costs of annual guarantees for a plurality of index-linked life insurance products are allocated to the risk fund.

55. The method of claim 53, wherein the risk fund includes surplus funds.

* * * * *

UNITED STATES PATENT AND TRADEMARK OFFICE
CERTIFICATE OF CORRECTION

PATENT NO. : 7,376,609 B2  Page 1 of 1
APPLICATION NO. : 09/845669
DATED : May 20, 2008
INVENTOR(S) : Brian James Clark and William Jeffrey Heng It is certified that error appears in the above-identified patent and that said Letters Patent is hereby corrected as shown below:

At column 10, line 21, after "the" delete "insu" and insert --insurance--.

At column 11, line 9, after "guaranteed" delete "principle" and insert --principal--.

At column 13, line 20, after "step" delete "508" and insert --510--.

At column 16, line 27, after "1" insert --wherein--.

At column 16, line 34, after "the" delete "animal" and insert --annual--.

At column 17, line 24, after "the" delete "hinds" and insert --funds--.

At column 17, line 46, after "method" insert --of--.

At column 18, line 29, after "on" insert --a--.

At column 18, line 54, delete "finds" and insert --funds--.

At column 19, line 23, after "32," insert --wherein--.

At column 19, line 36, after "-of" insert -- - --.

Signed and Sealed this

Sixteenth Day of September, 2008

JON W. DUDAS
*Director of the United States Patent and Trademark Office*